Patented Aug. 26, 1952

2,608,557

UNITED STATES PATENT OFFICE 2,608,557

METHOD OF PRODUCING 2-SUBSTITUTED QUINOLINES

John W. Copenhaver, Easton, Pa., assignor to General Aniline & Film Corporation, New York, N. Y., a corporation of Delaware No Drawing. Application December 15, 1948, Serial No. 65,537

7 Claims. (Cl. 260—283)

This invention relates to the production of 2-substituted quinoline derivatives.

I have found that 2-substituted quinoline derivatives may be obtained in a simple manner by reacting a primary aromatic amine with a 1,1,3-trialkoxy 3-substituted propane in the presence of an acidic catalyst.

The reaction, and also the type of reactants employable and products obtained, may be illustrated by the following general equation:

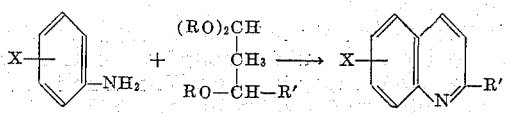

wherein R is alkyl, R' is alkyl or aryl and X may represent one or more substituents of the class consisting of halogen, hydroxyl, nitro, amino, alkyl or substituted alkyl, aryl or substituted aryl, alkoxy, aryloxy, thioalkyl, hydrogen or fused rings.

The 1,1,3-trialkoxy 3-substituted propane employed in the present reaction may advantageously be an alkylidene diether of the type obtainable by causing vinyl ether to react with an acetal in the presence of an inorganic practically anhydrous acid reacting catalyst capable of promoting the polymerization of vinyl ethers. Certain products of this type and their preparation are described in United States Patent No. 2,165,962 to Mueller-Cunradi et al. Since the groups OR are lost during the reaction (being converted to alcohols) they exert no influence on the reaction, but for economic reasons it is preferable to employ the 1,1,3-tri-lower alkoxy propanes (i. e. compounds in which the groups OR are methoxy or ethoxy). As specific examples of such 1,1,3-trialkoxy 3-substituted propanes which may be employed in practicing the present invention, may be mentioned 1,1,3-trialkoxy butane, hexane, octanes and their homologues and 1,1,3-trialkoxy-3-phenyl propane and similar compounds.

As examples of primary aromatic amines which may be employed in practicing the present invention may be mentioned aniline, isomeric toluidines, isomeric anisidines, naphthylamines, chloranilines, chlortoluidines, amino phenols and similar products of the type indicated above.

As catalysts for the reaction may be mentioned salts such as ammonium nitrate, ammonium sulfate, ammonium chloride and the like, organic sulfonic acids such as p-toluene sulfonic acid, mineral acids such as sulfuric acid, phosphoric acid, hydrochloric acid and the like. It will be apparent that when an acid such as hydrochloric acid is employed as a catalyst it will react with the aromatic amine present to form an amine salt, and if desired, small (catalytic) amounts of amine salts (e. g. amine hydrochlorides) may be employed as such to catalyze the reaction, either along with or in place of the preferred ammonium chloride catalyst. Only small amounts of acid or acid reacting salt need be employed, amounts within the range of 0.5 to 5% (usually 1–2%) by weight of the 1,1,3-trialkoxy propane being preferred.

The reaction may advantageously be carried out by heating a mixture of a primary aromatic amine and 1,1,3-trialkoxy 3-substituted propane in the presence of a small amount of an acidic catalyst. It has been found that the temperature employed for the reaction is not highly critical and the reaction has been successfully carried out at temperatures of from 50–250° C. under atmospheric pressure, although lower or higher pressures may be employed if desired.

It has been found that the yield of 2-substituted quinoline derivative is appreciably increased if the reaction is carried out in the presence of a hydrogen acceptor, though the presence of such a hydrogen acceptor is not essential to operability. Among the hydrogen acceptors which have been found to be useful for increasing the yield may be mentioned anils, which may be formed in the reaction mixture (to act as a hydrogen acceptor) by employing an excess of the primary aromatic amine and adding a small amount of an acetal such as dimethyl or diethyl acetal, so as to form an anil. Aromatic nitro compounds such as nitrobenzenes have also been employed as hydrogen acceptors with a substantial increase in yield.

The following specific examples illustrate the details of the preferred embodiments of the present invention. The parts are by weight:

Example I 186 parts of aniline and 296 parts of 1,1,3-trimethoxy butane mixed with 3 parts of ammonium chloride were heated under a small fractionating column to 65° C., at which point methanol was distilled over and the heating continued until no more methanol distilled over. The catalyst was then neutralized by the addition of alkali (sodium carbonate) and the reaction products were fractionally distilled. 95 parts of quinaldine (boiling point 115–116° C. at 11.5 mm.) were obtained, together with some N-ethyl aniline and unreacted 1,1,3-trimethoxy butane. The yield of quinaldine by this procedure was about 35%.

Example II 186 parts of aniline and 148 parts of 1,1,3-trimethoxy butane mixed with 1.5 parts of ammonium chloride were heated under a small fractionating column until no more methanol distilled over. The catalyst was then neutralized with alkali (sodium carbonate) and the reaction products fractionally distilled. There was obtained 68 parts or 47.5% quinaldine and 29 parts or 24% N-ethyl aniline.

Example III 186 parts of aniline and 148 parts of 1,1,3-trimethoxy butane and 90 parts of dimethyl acetal mixed with 4 parts of ammonium chloride were heated under a small fractionating column. An azeotrope of dimethyl acetal and methyl alcohol was slowly removed by distillation and the heating continued until no more of the azeotrope was distilled over. The catalyst was then neutralized by the addition of alkali (sodium carbonate) and the reaction products fractionally distilled. There was obtained 79 parts or 55% quinaldine, 36 parts or 30% N-ethyl aniline.

The above procedure was repeated, employing 62 parts of nitrobenzene in place of the 90 parts of dimethyl acetal, and the amount of aniline was decreased to 140 parts. There was thus obtained a 55% yield of quinaldine.

Example IV 246 parts of o-anisidine, 148 parts of 1,1,3-trimethoxy butane and 90 parts of dimethyl acetal containing 4 parts of ammonium chloride were heated under a small fractionating column and an azeotrope of dimethyl acetal-methyl alcohol slowly removed by distillation. When no more of the azeotrope distilled over, the catalyst was neutralized by the addition of alkali (sodium carbonate) and the reaction product fractionally distilled. There was thus obtained 44 parts of 8-methoxy quinaldine.

I claim:

1. A method of producing 2-substituted quinolines which comprises reacting under anhydrous conditions a primary aromatic amine with a 1,1,3-trialkoxy 3-substituted propane of the formula:

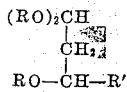

wherein R is alkyl and R' is a member of the group consisting of alkyl and aryl radicals, in the presence of from 0.5 to 5% by weight thereof of an anhydrous acid catalyst.

2. The process as defined in claim 1, wherein the alkoxy substituents and the 1,1,3-trialkoxy 3-substituted propane specified are lower alkoxy substituents.

3. The process of producing 2-substituted quinoline derivatives which comprises reacting under anhydrous conditions a primary aromatic amine with a 1,1,3-tri-lower alkoxy 3-substituted propane of the formula:

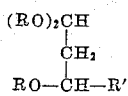

wherein R is alkyl and R' is a member of the group consisting of the group of alkyl and aryl radicals in the presence of from 0.5 to 5% by weight thereof of an anhydrous acidic catalyst and a hydrogen acceptor.

4. The process as defined in claim 3, wherein the hydrogen acceptor specified is an aromatic nitro compound.

5. The process as defined in claim 3, wherein the hydrogen acceptor specified is an anil obtained by employing an excess of the primary aromatic amine specified and incorporating a small amount of a lower alkyl acetal of acetaldehyde.

6. The method of producing quinaldine which comprises reacting under anhydrous conditions 1,1,3-tri-lower alkoxy butane with aniline in the presence of from 0.5 to 5% by weight thereof of a small amount of an anhydrous acid catalyst.

7. The method as defined in claim 6, wherein the acid catalyst specified is ammonium chloride.

JOHN W. COPENHAVER.

REFERENCES CITED

The following references are of record in the file of this patent:

UNITED STATES PATENTS

| Number | Name | Date |
|---|---|---|
| 1,752,492 | Kyrides | Apr. 1, 1930 |
| 2,035,751 | Kunz et al. | Mar. 31, 1936 |
| 2,165,962 | Mueller-Cunradi et al. | July 11, 1939 |